(12) United States Patent
Novo Diaz et al.

(10) Patent No.: US 10,869,172 B2
(45) Date of Patent: Dec. 15, 2020

(54) MANAGEMENT OF COMMUNICATION BETWEEN M2M DEVICE AND M2M SERVER WITH FINITE STATE TRANSITIONS CREATED BY THE M2M DEVICE

(71) Applicant: Telefonaktiebolaget LM Ericsson (Publ), Stockholm (SE)

(72) Inventors: Oscar Novo Diaz, Jorvas (FI); Nicklas Beijar, Jorvas (FI); Jaime Jiménez, Jorvas (FI); Tero Kauppinen, Jorvas (FI); Jimmy Kjällman, Jorvas (FI); Miika Komu, Jorvas (FI); Petri Jokela, Jorvas (FI); Jan Melén, Jorvas (FI); Roberto Morabito, Jorvas (FI); Mert Ocak, Jorvas (FI); Maria Ines Robles, Jorvas (FI); Mohit Sethi, Jorvas (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 15/760,512

(22) PCT Filed: Sep. 18, 2015

(86) PCT No.: PCT/EP2015/071454
§ 371 (c)(1),
(2) Date: Mar. 15, 2018

(87) PCT Pub. No.: WO2017/045727
PCT Pub. Date: Mar. 23, 2017

(65) Prior Publication Data
US 2018/0279099 A1    Sep. 27, 2018

(51) Int. Cl.
*H04W 4/70* (2018.01)
*H04L 12/24* (2006.01)
(Continued)

(52) U.S. Cl.
CPC ............ *H04W 4/70* (2018.02); *G06F 9/4498* (2018.02); *G06F 9/546* (2013.01);
(Continued)

(58) Field of Classification Search
CPC ........ H04W 4/70; G06F 9/546; G06F 9/4498; H04L 41/0813; H04L 41/0806; H04L 67/34; H04L 41/0803
See application file for complete search history.

(56) References Cited

U.S. PATENT DOCUMENTS 3,932,132 A  *  1/1976  Hijikata  ........... G01N 35/00029
                                                  422/404
4,727,575 A  *  2/1988  Hansen  ................. G06F 9/4498
                                                  379/93.14

(Continued)

OTHER PUBLICATIONS

Written Opinion and International Search Report dated Jan. 6, 2016 issued in international application No. PCT/EP2015/071454. (11 total pages).

(Continued)

*Primary Examiner* — Daniel C. Murray
(74) *Attorney, Agent, or Firm* — Rothwell, Figg, Ernst & Manbeck, P.C.

(57) ABSTRACT

A method performed by a machine-to-machine, M2M, server for managing communication with a M2M device is disclosed. The method comprising configuring the M2M device with a finite number of predetermined states and predetermined transitions for moving the M2M device into one of its predetermined states, and sending a message to the M2M device for executing at least one of the predetermined transitions.

16 Claims, 12 Drawing Sheets

900 receiving instructions from the managing node to configure itself with a finite number of predetermined states and predetermined transitions — 901 configuring the predetermined states and transitions — 902 receiving a message from the managing node for executing at least one of the predetermined transitions — 903

(51) Int. Cl.
   *G06F 9/54*   (2006.01)
   *G06F 9/448*  (2018.01)
   *H04L 29/08*  (2006.01)

(52) U.S. Cl.
   CPC ...... *H04L 41/0803* (2013.01); *H04L 41/0806* (2013.01); *H04L 41/0813* (2013.01); *H04L 67/34* (2013.01)

(56) References Cited

U.S. PATENT DOCUMENTS

| | | | | |
|---|---|---|---|---|
| 5,379,423 A * | 1/1995 | Mutoh | ............... | G06F 16/289 |
| 5,623,680 A * | 4/1997 | Flora-Holmquist | ............... | G05B 19/042 |
| | | | | 711/220 |
| 6,324,496 B1 * | 11/2001 | Alur | ............... | G06F 11/3608 |
| | | | | 703/17 |
| 6,535,975 B1 * | 3/2003 | Thompson | ............... | G06F 9/44505 |
| | | | | 707/999.104 |
| 6,598,225 B1 * | 7/2003 | Curtis | ............... | G06F 9/4498 |
| | | | | 717/175 |
| 6,874,145 B1 * | 3/2005 | Ye | ............... | G06F 9/44557 |
| | | | | 348/E5.006 |
| 6,901,578 B1 * | 5/2005 | Beaven | ............... | G06Q 10/10 |
| | | | | 715/202 |
| 7,039,893 B2 * | 5/2006 | DenBraber | ............... | G06F 17/5045 |
| | | | | 716/117 |
| 7,277,920 B2 * | 10/2007 | Ramesh | ............... | G06F 9/4498 |
| | | | | 709/209 |
| 7,369,540 B1 | 5/2008 | Giroti | | |
| 7,509,627 B1 | 3/2009 | Ayachitula et al. | | |
| 7,640,317 B2 * | 12/2009 | Jain | ............... | H04L 41/028 |
| | | | | 709/213 |
| 8,595,336 B1 * | 11/2013 | Tsern | ............... | A63F 13/26 |
| | | | | 709/221 |
| 8,843,889 B2 | 9/2014 | Anderson | ............... | G06F 8/70 |
| | | | | 717/120 |
| 9,094,777 B2 * | 7/2015 | Umapathy | ............... | H04L 41/0813 |
| 9,288,114 B2 * | 3/2016 | Zhang | ............... | H04W 88/16 |
| 9,516,449 B2 * | 12/2016 | Lehane | ............... | H04W 24/02 |
| 9,639,502 B1 | 5/2017 | Kumar | ............... | H04L 41/0893 |
| 9,838,258 B2 * | 12/2017 | Wang | ............... | H04L 41/0853 |
| 9,973,372 B2 * | 5/2018 | Abela | ............... | H04L 67/2842 |
| 10,176,237 B2 * | 1/2019 | Nadgir | ............... | G06Q 10/06316 |
| 10,242,315 B2 * | 3/2019 | Abadi | ............... | G06N 5/02 |
| 10,289,082 B2 * | 5/2019 | Husain | ............... | G05B 19/0426 |
| 10,348,447 B2 * | 7/2019 | Olshinka | ............... | H04L 43/0811 |
| 10,412,190 B1 * | 9/2019 | Roche | ............... | H04L 67/42 |
| 2002/0052911 A1 * | 5/2002 | Kumar | ............... | G06F 9/546 |
| | | | | 718/107 |
| 2003/0041131 A1 * | 2/2003 | Westerinen | ............... | G06F 16/9024 |
| | | | | 709/221 |
| 2004/0003355 A1 * | 1/2004 | DenBraber | ............... | G06F 17/5045 |
| | | | | 716/117 |
| 2004/0034850 A1 * | 2/2004 | Burkhardt | ............... | G06F 8/65 |
| | | | | 717/120 |
| 2004/0079922 A1 * | 4/2004 | Yokokouji | ............... | C09K 19/20 |
| | | | | 252/299.64 |
| 2004/0210905 A1 * | 10/2004 | Ramesh | ............... | G06F 9/4498 |
| | | | | 719/310 |
| 2005/0035784 A1 * | 2/2005 | Gould | ............... | G06F 9/4498 |
| | | | | 326/46 |
| 2006/0294493 A1 * | 12/2006 | Melby | ............... | G06F 9/465 |
| | | | | 717/104 |
| 2007/0056031 A1 * | 3/2007 | Sivaramakrishna Iyer | ............... | H04L 41/00 |
| | | | | 726/12 |
| 2007/0268506 A1 * | 11/2007 | Zeldin | ............... | H04L 41/0806 |
| | | | | 358/1.13 |
| 2007/0268514 A1 * | 11/2007 | Zeldin | ............... | H04L 41/0213 |
| | | | | 358/1.15 |
| 2007/0268515 A1 * | 11/2007 | Freund | ............... | H04L 67/34 |
| | | | | 358/1.15 |
| 2007/0268516 A1 * | 11/2007 | Bugwadia | ............... | H04L 41/0809 |
| | | | | 358/1.15 |
| 2008/0270101 A1 * | 10/2008 | Salmela | ............... | G06F 8/10 |
| | | | | 703/17 |
| 2009/0063825 A1 * | 3/2009 | McMillen | ............... | G06F 9/4498 |
| | | | | 712/220 |
| 2009/0217238 A1 * | 8/2009 | Errickson | ............... | G06F 9/546 |
| | | | | 717/110 |
| 2010/0138515 A1 * | 6/2010 | Ruiz-Velasco | ............... | G06F 9/445 |
| | | | | 709/217 |
| 2011/0161926 A1 * | 6/2011 | Cruise | ............... | G06F 9/4498 |
| | | | | 717/113 |
| 2011/0246962 A1 * | 10/2011 | Meijer | ............... | G06F 9/4498 |
| | | | | 717/106 |
| 2012/0233587 A1 * | 9/2012 | Rabinovich | ............... | G06F 8/10 |
| | | | | 717/105 |
| 2012/0254876 A1 * | 10/2012 | Bishop | ............... | G06F 9/542 |
| | | | | 718/102 |
| 2012/0278773 A1 * | 11/2012 | Paruthi | ............... | G06F 17/5022 |
| | | | | 716/107 |
| 2013/0176940 A1 * | 7/2013 | Hohammed | ............... | H04W 24/00 |
| | | | | 370/328 |
| 2013/0205104 A1 * | 8/2013 | Hesse | ............... | G05B 19/045 |
| | | | | 711/154 |
| 2014/0019636 A1 * | 1/2014 | Abela | ............... | H04L 43/022 |
| | | | | 709/231 |
| 2014/0073367 A1 * | 3/2014 | Chou | ............... | H04W 4/70 |
| | | | | 455/466 |
| 2014/0126581 A1 * | 5/2014 | Wang | ............... | H04L 41/0806 |
| | | | | 370/431 |
| 2014/0143390 A1 * | 5/2014 | Umapathy | ............... | H04L 41/0813 |
| | | | | 709/221 |
| 2015/0055405 A1 * | 2/2015 | Shiratake | ............... | G11C 11/1697 |
| | | | | 365/158 |
| 2015/0098361 A1 * | 4/2015 | Zhang | ............... | H04W 24/02 |
| | | | | 370/254 |
| 2015/0106303 A1 * | 4/2015 | Abadi | ............... | G06N 5/02 |
| | | | | 706/11 |
| 2016/0007137 A1 * | 1/2016 | Ahn | ............... | H04W 4/70 |
| | | | | 370/254 |
| 2016/0094628 A1 * | 3/2016 | Husain | ............... | G05B 19/0426 |
| | | | | 700/275 |
| 2016/0110199 A1 * | 4/2016 | Kim | ............... | G06F 11/30 |
| | | | | 712/238 |
| 2016/0164730 A1 * | 6/2016 | Wang | ............... | H04W 4/70 |
| | | | | 709/221 |
| 2017/0207954 A1 * | 7/2017 | Yang | ............... | H04W 4/70 |
| 2017/0279306 A1 * | 9/2017 | Elad | ............... | H02J 50/12 |
| 2018/0124183 A1 * | 5/2018 | Kozat | ............... | H04L 41/20 |
| 2018/0210729 A1 * | 7/2018 | Bender | ............... | G06F 9/4498 |
| 2018/0262394 A1 * | 9/2018 | Sakura | ............... | H04L 41/0813 |
| 2018/0321952 A1 * | 11/2018 | Rougier | ............... | G06F 9/4498 |
| 2018/0331782 A1 * | 11/2018 | Olshinka | ............... | H04W 4/50 |

OTHER PUBLICATIONS

Kovatsch, M. et al. "CoAP Implementation Guidance; draft-ieft-lwig-coap-03.txt" COAP Implementation Guidance; Draft-IETF-LWIG-COAP-03.TXT, Internet Engineering Task Force, IETF; Standardworkingdraft, Internet Society (ISOC) 4, Rue des Falaises CH-1205 Geneva, Switzerland, Jul. 6, 2015 (Jul. 6, 2015), pp. 1-29.

* cited by examiner

MANAGEMENT OF COMMUNICATION BETWEEN M2M DEVICE AND M2M SERVER WITH FINITE STATE TRANSITIONS CREATED BY THE M2M DEVICE

CROSS REFERENCE TO RELATED APPLICATION(S)

This application is a 35 U.S.C. § 371 National Stage of International Patent Application No. PCT/EP2015/071454, filed Sep. 18, 2015, designating the United States, the disclosure of which is incorporated by reference.

TECHNICAL FIELD

The present invention relates to methods for managing communication between a machine-to-machine (M2M) device and a M2M server. The present invention also relates to a M2M server and M2M devices, and to a computer program configured to carry out methods for establishing operational status of a M2M device.

BACKGROUND

The Internet of Things (IoT) is a network of physical smart objects such as sensors that exchange information with other sensors, devices or servers, without human interaction. As such, these devices are sometimes referred to as machine-to-machine (M2M) devices. Some examples of services in IoT include built-in sensors in automobiles or homes, heart monitoring implants or smart thermostats systems.

One aspect of M2M devices is devices that are configured to perform simpler tasks using minimal amount of energy. These devices are constrained in battery, central processing unit (CPU) and memory, and are usually configured to be autonomous for a long period of time. For instance, one such a device may be a sensor integrated into a wall of a house, wherein the device is configured to last for years without charging its battery. Such strict use cases make it very difficult to use traditional Internet protocols in IoT scenarios.

To adapt to the requirements of these constrained (M2M) devices, light and compact application protocols have been developed such as Lightweight Machine to Machine (LWM2M), constrained application protocol (CoAP) and MQTT. To provide data integrity and interoperability in IoT networks, IPSO Alliance has defined standardized Smart Object models for IoT networks. These models have already been integrated into several IoT solutions using CoAP and MQTT.

M2M devices may communicate with other M2M devices and systems using wireless or wired technology. Regarding wireless technologies, M2M devices may support long range communication such as radio as well as short range communication technologies such as Bluetooth or Wi-Fi. The Wi-Fi alliance has developed the Internet Engineering Task Force (IEEE) 802.11ah wireless network standard. The 802.11ah is an amendment that is designed to be more energy efficient than other IEEE 802.11 technologies. Thus, this standard is particularly beneficial for M2M devices that have limited power source. Bluetooth Low Energy (BLE) is another wireless network intended to provide considerably reduced power consumption and cost while maintaining a similar communication range like its predecessor Bluetooth. ZigBee is yet another example of a wireless network built for small, low-powered digital radios, and it is based on the standard IEEE 802.15.4.

Although new protocols and wireless technologies have emerged, the IoT protocols may still be considered too heavy for some specific scenarios. For example, turning on a light using the IPSO and CoAP standard can be complicated as illustrated in the following example;

Header:Get (T=NON, Code+1, MID=0x7d35)
Token: 0x20
Un-Path: "311/2/5850/1"

Furthermore, it could be argued that CoAP is a binary protocol and that the integrity of some of the data transmitted in CoAP needs to be checked and that also the reliability of the messages need to be confirmed. Although these are important aspects, they may also cause unnecessary burden to devices with very limited capabilities.

SUMMARY

It is an aim of the present invention to provide methods, apparatus and computer readable media which at least partially address one or more of the challenges discussed above.

According to an aspect of the invention, there is provided a method performed by a machine-to-machine, M2M, server for managing communication with a M2M device, the method comprising configuring the M2M device with a finite number of predetermined states and predetermined transitions for moving the M2M device into one of its predetermined states, and sending a message to the M2M device for executing at least one of the predetermined transitions.

Each state may be associated with a plurality of configurable elements.

In one embodiment, the method may comprise as a preceding step, defining the predetermined states and transitions, and creating instructions associated with each state and transition so as to configure the M2M device with said states and transitions.

In another embodiment, the method may further comprise as a preceding step, receiving instructions for the predetermined states and transitions from another node.

In one embodiment, configuring the M2M device comprises sending instructions to the M2M device to create, delete or modify a state or a transition.

In another aspect of the invention, there is provided, a machine-to-machine, M2M, server for managing communication with a M2M device, the M2M server comprising a configuration module for configuring the M2M device with a finite number of predetermined states and predetermined transitions for changing between the states, a communication module for sending a message to the M2M device for executing at least one of the predetermined transitions.

In one embodiment, each state is associated with a plurality of configurable elements.

In another embodiment, the M2M server further comprises a generation module for defining the predetermined states and transitions, and creating instructions associated with each state and transition so as to configure the M2M device with said states and transitions.

In one embodiment, the communication module further comprises means for receiving instructions for the predetermined states and transitions from a node.

In another embodiment, the communication module further comprises means for sending instructions to the M2M device to create, delete or modify a state or a transition so as to configure the M2M device.

In another aspect of the invention, there is provided a M2M server for managing communication with a machine-to-machine, M2M, device, the M2M server comprising a processor and a memory, said memory containing instructions that when executed cause the M2M server to configure the M2M device with a finite number of predetermined states and predetermined transitions for moving the M2M device into one of its predetermined states, and to send a message to the M2M device for executing at least one of the predetermined transitions.

In yet another aspect of the invention, there is provided a method performed by a machine-to-machine, M2M, device for communicating with a M2M server, the method comprising receiving instructions from the M2M server to configure itself with a finite number of predetermined states and predetermined transitions for moving the M2M device into one of its predetermined states, configuring the predetermined states and transitions, and receiving a message from the M2M server for executing at least one of the predetermined transitions.

In one embodiment, the method further comprises executing the at least one predetermined transition so that the M2M device changes state. In another embodiment, the method further comprises executing the at least one predetermined transition so that the M2M device remains in the same state.

Each state may be associated with a plurality of configurable elements.

In the method, configuring itself may comprise receiving instructions from the M2M server for creating, deleting or modifying a state or a transition.

In one embodiment, the method may further comprise sending its predetermined states and transitions to another node.

In another embodiment, the method may further comprise broadcasting its predetermined states and transitions to a node connected to the same network as the M2M device.

In any of the methods described above, the message for executing at least one of the predetermined transitions is 1, 2 or 3 bytes in length.

According to yet another aspect of the invention, there is provided a machine-to-machine, M2M, device for communicating with a M2M server, the device comprising a communication module for receiving instructions from the M2M server to configure itself with a finite number of predetermined states and predetermined transitions for moving the M2M device into one of its predetermined states, a configuration module for executing the instructions so as to configure the predetermined states and transitions, wherein the communication module further comprising means for receiving a message from the M2M server for executing at least one of the predetermined transitions.

In one embodiment, the configuration module further comprises means for executing the at least one predetermined transition so that the M2M device changes state. In another embodiment, the configuration module further comprises means for executing the at least one predetermined transition so that the M2M device remains in the same state.

Each state is associated with a plurality of configurable elements.

In one embodiment, the configuration module further comprises means for creating, deleting and modifying a state or a transition so as to configuring itself upon receiving instructions from the M2M server.

In another embodiment, the communication module further comprises means for sending its predetermined states and transitions to another node.

The communication module may further comprise means for broadcasting its predetermined states and transitions to a node connected to the same network as the M2M device.

The message for executing at least one of the predetermined transitions may be 1, 2 or 3 bytes in length.

According to one aspect of the invention, there is provided an apparatus comprising a M2M device as described above, wherein the apparatus is a vehicle, user equipment or an appliance.

According to another aspect of the invention, there is provided a machine-to-machine, M2M, device for communicating with a M2M server, the M2M device comprising a processor and a memory, said memory containing instructions that when executed cause the device to receive instructions from the M2M server to configure itself with a finite number of predetermined states and predetermined for moving the M2M device into one of its predetermined states, configure the predetermined states and transitions, and receive a message from the M2M server for executing at least one of the predetermined transitions.

According to yet another aspect of the invention, there is provided a method performed by a node for managing communication between a machine-to-machine, M2M, server and a M2M device, the method comprising storing instructions of predetermined states and predetermined transitions for a M2M device and forwarding said instructions to a first M2M server.

The method may further comprising receiving instructions of predetermined states and predetermined transitions from a second M2M server and then forwarding said instructions to the first M2M server.

According to another aspect of the invention, there is provided a system for managing communication between a machine-to-machine, M2M, server and a M2M device, the system comprising a M2M server comprising means for configuring a M2M device with a finite number of predetermined states and predetermined transitions for moving the M2M device into one of its predetermined states, the M2M server further comprising means for instructing the M2M device to execute at least one of the predetermined transitions, and the M2M device further comprising means for moving into a state upon executing said at least one the predetermined transitions.

According to a further aspect of the invention, there is provided a computer program which, when run on a computer, causes the computer to carry out a method as described above.

According to yet another aspect of the invention, there is provided a computer program product comprising computer readable storage medium and a computer program as described above.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide methods for managing communication with a machine-to-machine (M2M) device. In aspects of the invention a M2M device is configured to have a finite number of predetermined states and predetermined transitions so that when the device receives a command to execute at least one of the predetermined transitions, the device moves into a state. The device may move into a different state upon executing the at least one transition or it may remain in its state either by executing a series of transitions such that it ends up in the same state it was initially in or by the transition pointing towards the state the device is already in. This provides many advantages, as is discussed below, one of which is that it forms the basis for a light protocol for Internet of Things (IoT).

Figure 1:
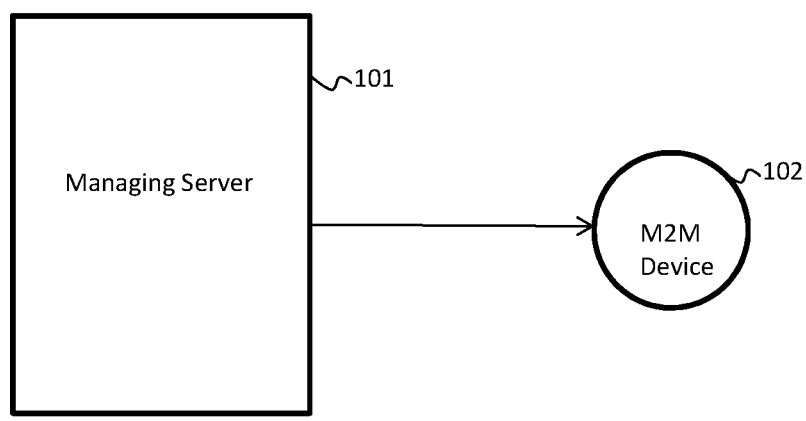
FIG. 1 is a schematic illustration of a M2M server configuring M2M devices.

FIG. 1 illustrates a managing server 101 configuring a M2M device 102 with a finite number of predetermined states and predetermined transitions. The M2M devices, as well as any reference to a M2M device herein, should be understood to be any device which is configured or configurable to communicate with another device, server or system without human interaction. The M2M device may for example be a sensor for light, pressure, temperature, vibration or actuators. The M2M device may form part of an apparatus such as a vehicle, an appliance (including a fridge, freezer or central heating), or a user equipment (such as a mobile phone, laptop, smart phone, wireless communication device).

The managing server 101 is a server configurable to connect to a M2M network, and as such any reference to a managing server herein is to be understood as a M2M server.

The managing server 101 is configured or comprises means for defining the predetermined states and predetermined transitions and then instructing the M2M device 102 to configure said states and transitions. In FIG. 1, the managing server defines the predetermined states and transitions either by input from a user or by input from another server. The managing server 101 then creates instructions, commands, operations or executable software codes (hereinafter referred to as instructions) for each state and transition and sends it to the M2M device 102. Upon receiving the instructions, the M2M device 102 executes said instructions such that it configures itself by, for example, creating, deleting or modifying the states and transitions.

The states and transitions can be considered to form part of a finite-state machine (FSM). An FSM is a mathematical model of computation that has a finite number of states. This means that a device, such as a sensor, is capable of assuming several defined states, for example, on, off or measuring. States may also be considered as conditions or modes that the M2M device can be in or assume. Moving or changing to a transition should be understood as an action that is executed that causes the M2M device to move into a state that it was already in or move into a different state.

Figure 2:
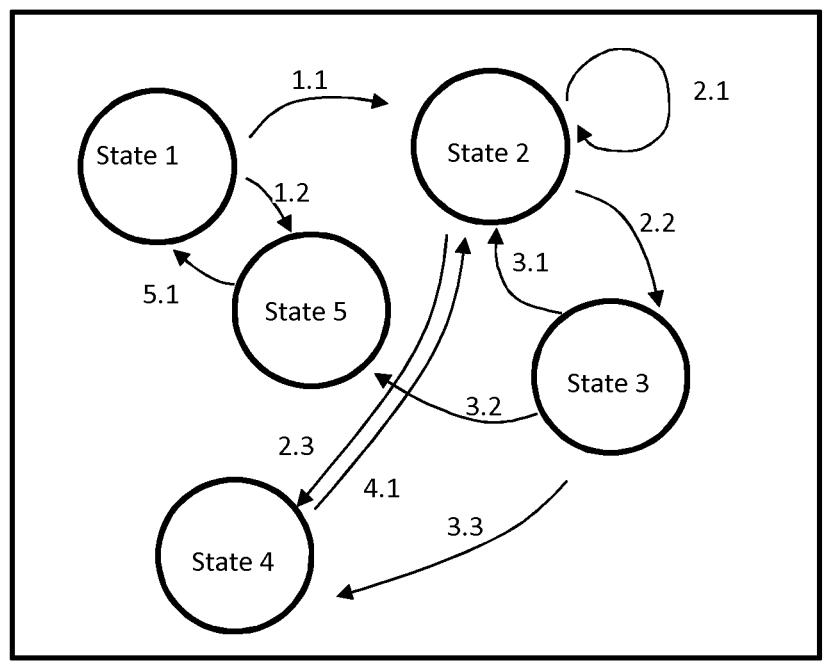
FIG. 2 is a schematic illustration of a finite state machine of a M2M device.

FIG. 2 shows an example of a FSM in a M2M device. The FSM comprises 5 states and 10 transitions (1.1, 1.2, 2.1, 2.2, 2.3, 3.1, 3.2, 3.3, 4.1 and 5.1). It may be that the M2M device 201 is a sensor with capabilities of regulating the temperature such that state 1 corresponds to "on", state 2 corresponds to "measure temperature", state 3 corresponds to "increase temperature to 20° C.", state 4 corresponds to "decrease temperature to 18° C." and state 5 corresponds to "off". If the M2M device is in state 5 it is switched off and upon receiving a command to execute transition 5.1, the device moves into state 1 meaning that it switches itself on. It may then be that the device receives a command to execute transition 1.1 such that the device moves or changes into state 2. When doing so the device will measure the temperature. If the device then receives a further command to execute transition 2.2 the device moves into state 3 which corresponds to increasing the temperature to 20° C. Thus, by the device receiving commands to execute different transitions the temperature can be regulated.

Transition 2.1 in FIG. 2 is an example of where the state does not change when the transition is executed. This is because the transition points towards the same state that the device is already in.

In the above example the managing server will have defined the different states either by input from a user or some other server. The managing server will also have configured or created instructions for each state and transition and sent these to the M2M device for the M2M device to configure itself with said states and transitions. The managing server can then change the state that the M2M device is in by sending commands to change state, for example by sending a command to execute a specific transition.

The managing server comprises a memory for storing the different states and transitions and so it can decide on the next action before contacting the M2M device and can instruct the M2M device to do something by sending a message commanding the M2M device to execute a transition. Thus, the communication between the managing server and the M2M device is minimal.

As described above, the managing server creates and sends instructions to the M2M device to create, delete or modify states and transitions. However, it should be understood that the present invention is not limited to these particular instructions. It is envisaged that the other instructions, such as copying, fall within the scope of the invention.

Upon having executed the instructions received from the managing server, the M2M device may send a response confirming that it has executed the instructions or alternatively it may send a response informing the managing server that it is not authorised to configure the M2M device, or that the request is a "bad request" or that the request is "not found".

Figure 3:
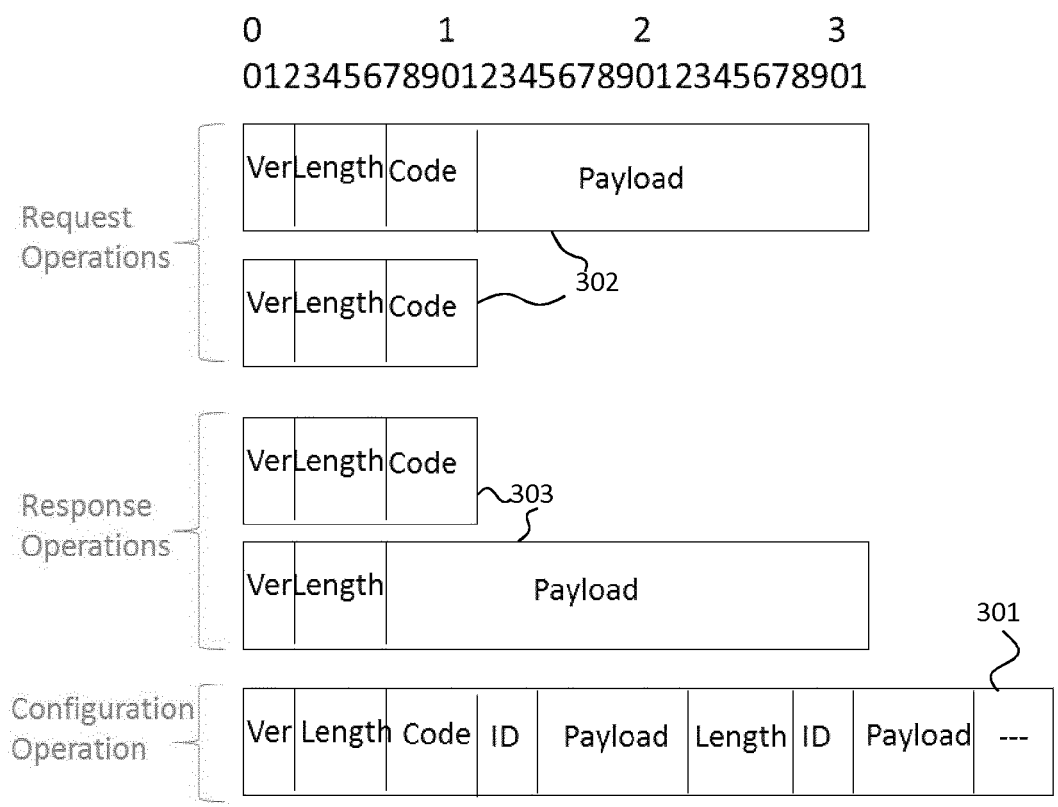
FIG. 3 is a schematic illustration of message formats.

FIG. 3 illustrates different message formats sent between a managing server and a M2M device according to embodiments of the present invention. Message format 301 for configuring a M2M device with a state or a transition defines different fields as will now be described.

Version (ver); This is a 2-bit unsigned integer. It indicates the version number of the protocol.

Length; This is a 5-bit unsigned integer. It indicates the length of the whole message or the length of a state or transition instruction.

Code; This is a 5-bit unsigned integer. It indicates different configuration or instruction codes including create (0), delete (1), modify (2), as well as different response codes such as created (3), deleted (4), changed (5), unauthorized (6), bad request (7), Not Found (8). It may also indicate commands such as go to state X (execute transition x) (9), State? (10), State information (11) or send FSM (12).

Payload; This includes extra information relating to the instruction codes, response codes and commands.

ID; This is a 3-bit unsigned integer. It indicates the identification of a state or a transition.

The above fields are also applicable to message format 302. This message format is used by the managing server to send to the M2M device a command to execute at least one transition. The above fields are also used in message format 303. This message format is used for response messages sent by the M2M device to the managing server in response to receiving a message instructing the M2M device to configure itself with states and/or transitions, as well to receiving commands such as executing a transition, current state or value of a reading.

The message formats illustrated in FIG. 3 form part of a binary protocol that can be used in communication between the managing server and the M2M device. Advantageously, the minimum length of a message comprising a command for executing a transition can be 1 byte. It may also be 2 or 3 bytes. Regardless, the message can be less than the 4 bytes-messages used in CoAP (constrained application protocol). Therefore, it is clear that embodiments of the present invention reduces the amount of data that is sent between M2M devices and managing servers which results in less strain on M2M networks and M2M devices. This is particularly important for M2M devices that have constrained resources such as battery, PCU and memory.

It should be understood that there may be variations in the message length, for example the configuration message 301 may be longer than 3 bytes. However, these messages will only be sent in specific circumstances when the M2M device needs to be configured with a new FSM.

The above message formats form basis for a binary protocol. However, it should be understood that variations of the protocol is intended to fall within the scope of the invention.

Figure 4:
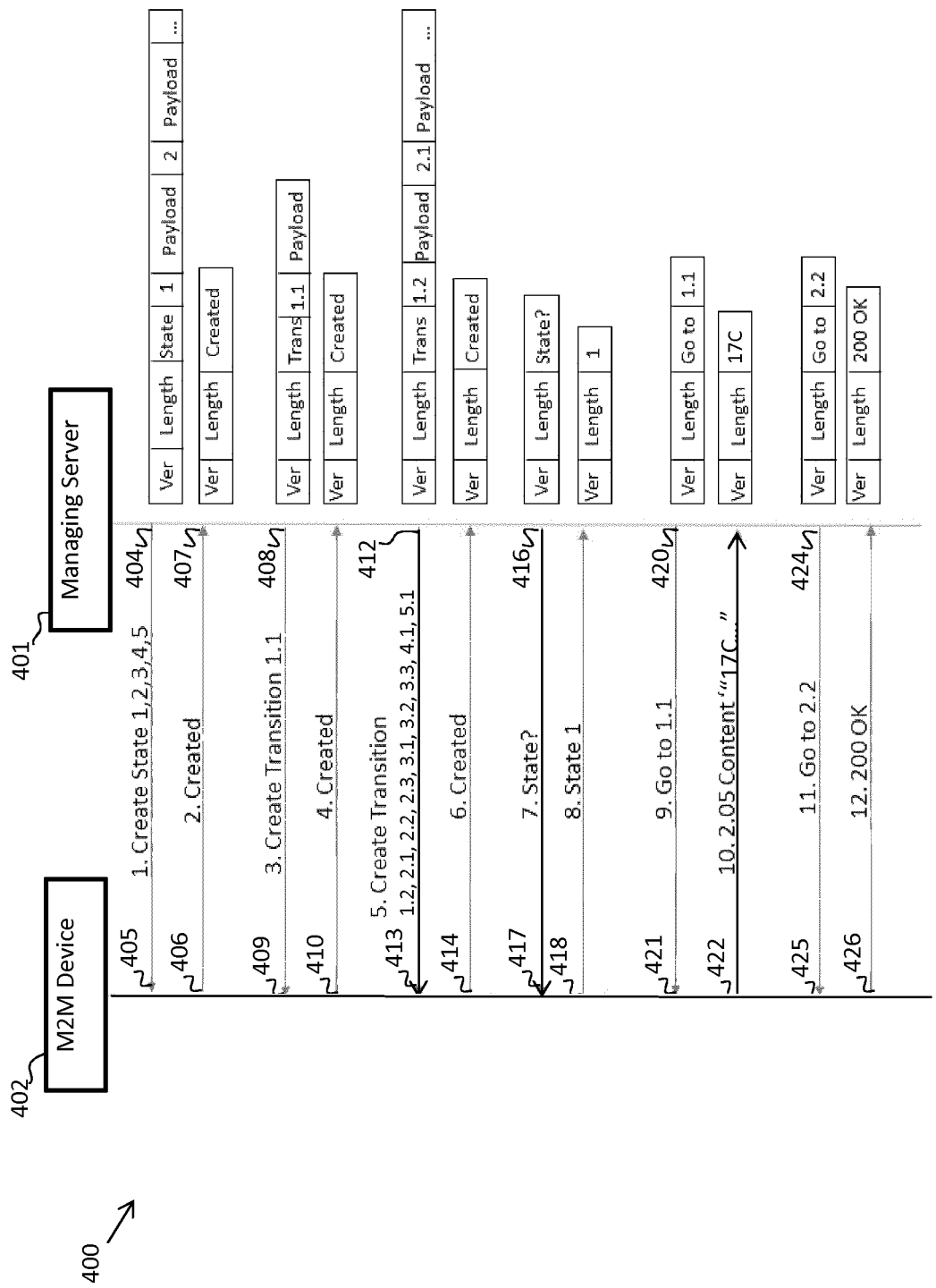
FIG. 4 is a message flow illustrating an example of a method of the present invention.

FIG. 4 illustrates a method 400 between a M2M device 402 and a Managing server 401. The method is shown as a message flow which also includes the message format of each message sent. As a first step, the managing server 401 sends 404 a message to the M2M device comprising instructions to create states 1, 2, 3, 4 and 5. For the sake of clarity these states correspond to the states described in FIG. 2, however it should be understood that these states may be any other state of a M2M device.

Upon receiving 405 the instructions, the M2M device 402 executes the instructions and configures itself with the five states. The M2M device 402 then sends 406 a response message to the managing server 401 confirming that it has created the five states. The managing server then receives 407 the response message.

In the next step, the managing server 401 sends 408 to the M2M device 402 a message with instructions to create a transition 1.1. Upon receiving the message 409, the M2M device 402 executes the instructions so as to create the transition. The M2M device then sends 410 to the managing server a response message for confirming that the transition has been created. The managing server then sends 412 to the M2M device 402 another message with a set of instructions for creating transitions 1.2, 2.1, 2.2, 2.3, 3.1, 3.2, 3.3, 4.1 and 5.1. Again these transitions may correspond to the transitions described in FIG. 2, however it may also correspond to some other transitions. Upon receiving the instructions 413, the M2M device 402 executes the instructions so as to create the transitions. The M2M device 402 then sends 414 a response message to the managing server confirming that the transitions have been created.

The managing sever 401 has now configured the M2M device 402 with a FSM, or in other words with a finite number of predetermined states and predetermined transitions for changing between the states. In the following message exchanges, the managing server 401 instructs the M2M device 402 to perform different tasks by instructing it to execute at least one of the transitions.

In step 416 in FIG. 4, the managing node sends to the M2M device 402 a message for reporting back with what state it is in. Upon receiving 417 the query, the M2M device 402 determines which state it is in (in this embodiment state 1), and then reports back 418 to the managing server 401 that it is in state 1. (When applying the configuration in FIG. 2, state 1 means that the M2M device is "on".) In the next step, the managing server 401 sends 420 a message to the M2M device 402 to execute transition 1.1. (The message may comprise a command to execute transition 1.1). Upon receiving 421 the message, the M2M device 402 executes the command so that the device moves or changes state into state 2. In state 2, the device takes temperature measurements in accordance with the configuration in FIG. 2. Once the M2M device has established a temperature value, it sends 422 the temperature value to the managing server 401. In FIG. 4, the temperature value is 17° C.

The managing server 401 then sends 424 to the M2M device 402 another message for executing transition 2.2 and as a result of receiving 425 the message the M2M device 402 executes transition 2.2 such that it moves to state 3 (which is increase the temperature to 20° C.). In response, the M2M device 402 sends 426 a response message to the managing server confirming that it has received the instructions. This is represented by "200 OK" in the message flow.

Although not illustrated in FIG. 4, it should be understood that the managing server 401 may send to the M2M device 402 a message for executing a plurality of transitions. For example, such a message may comprise instructions to execute transitions 1.1, 2.2 and 3.2. In the configuration described in FIG. 2, this would mean that the M2M device would first measure the temperature (state 2), then increase the temperature to 20° C. (state 3) and finally switch itself off (state 5).

As described above, a managing server according to an embodiment of the invention may define the predetermined states and transitions either by input from a user or by input from another server. The managing server may then create instructions for execution by the M2M device in order to configure said M2M device with the states and transitions.

Figure 5:
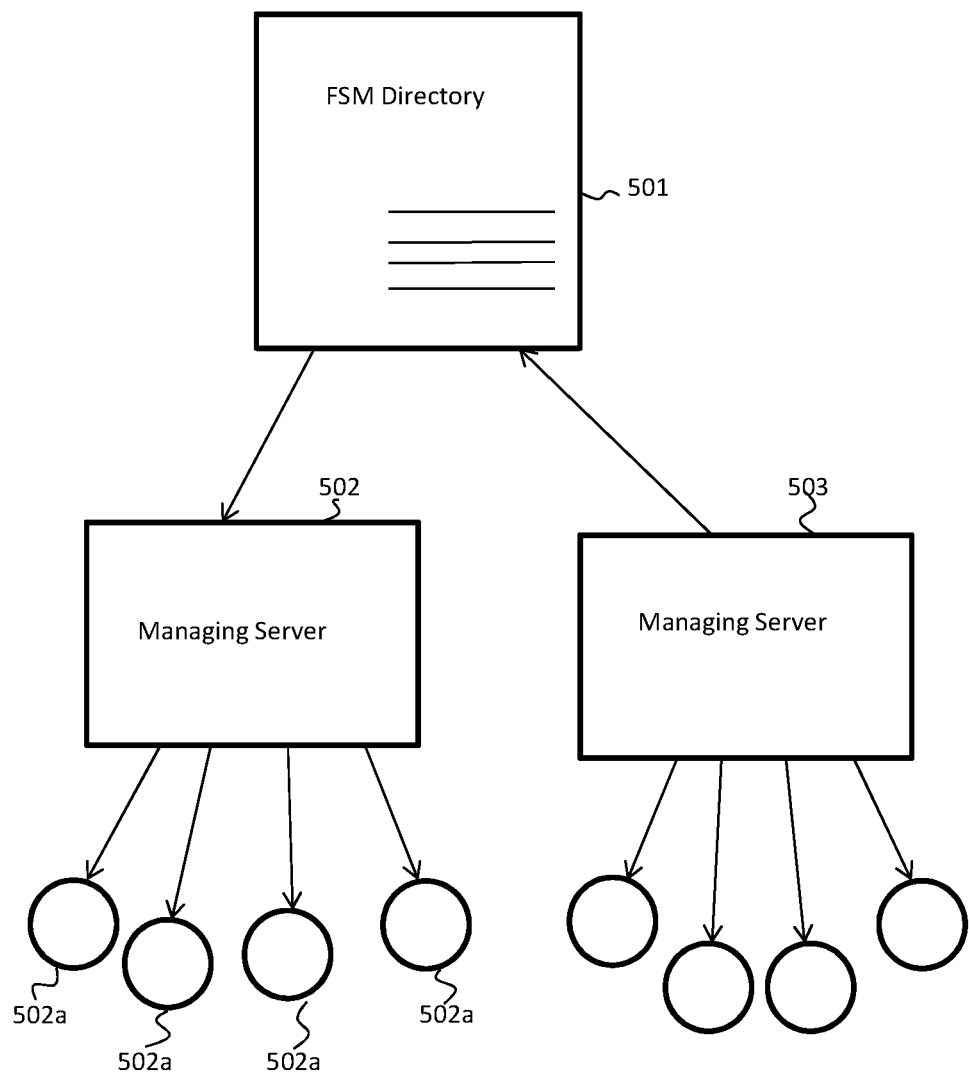
FIG. 5 is a schematic illustration of a directory, M2M servers and M2M devices.

In an alternative embodiment as shown in FIG. 5, there is a finite state machine directory (FSM directory) 501 which provides 505 a managing server 502 with an FSM or more particularly the details of the predetermined states and transitions and the associated instructions to be forwarded to a M2M device. The managing server 502 may either request the FSM from the FSM directory 501 or the FSM directory may broadcast the FSM to a plurality of managing servers. Once the managing server 502 has received the FSM it stores the FSM and configures its M2M devices 502a with the predetermined states and transitions of the FSM. In summary, the FSM directory 501 may act as a library of FSMs and may store several FSMs at a single time.

In the embodiment shown in FIG. 5, another managing server 503 may send 504 its FSM to the FSM directory 501. The FSM directory 501 then stores the FSM. The FSM directory 501 may store a plurality of FSMs such that managing servers can easily fetch a desired FSM. The managing server 502 can then request the FSM uploaded by the other managing server 503 relieving itself from having to configure the FSM including states and transitions and associated instructions.

The FSM directory 501 may be a server and it provides the advantage that it is a central source of FSMs such that each managing server does not have to waste resources configuring the same FSM.

Figure 6:
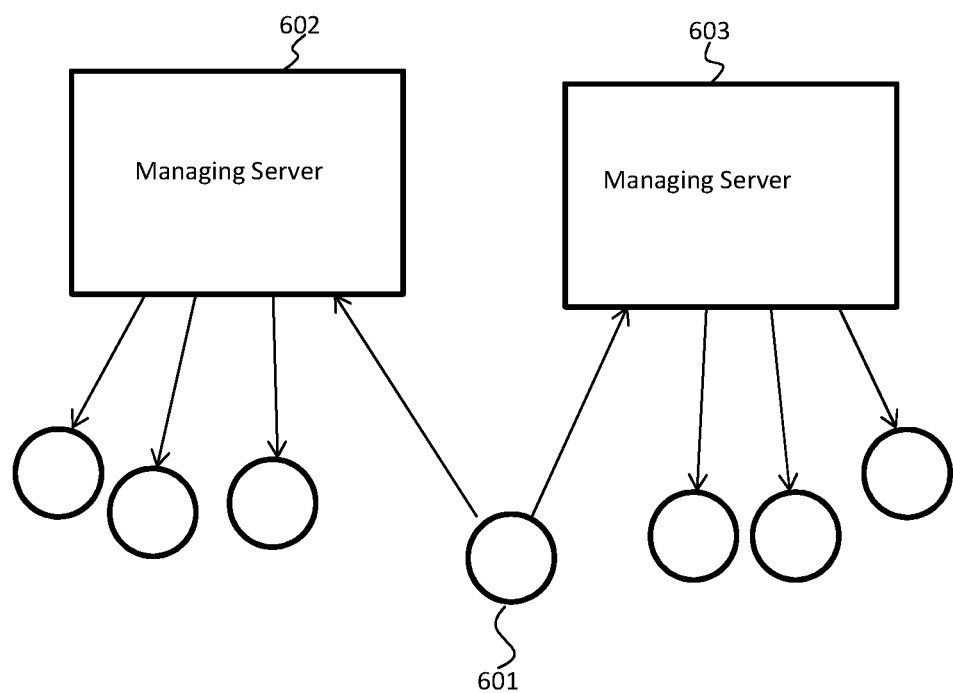
FIG. 6 is a schematic illustration of M2M servers and M2M devices.

In another alternative embodiment, as shown in FIG. 6, a M2M device 601 is configured with predefined states and transitions, and it sends its configuration to other managing servers 602, 603. In this case, the managing servers might have requested the information from the M2M device 601 or the M2M device 601 broadcasts or multicasts the information by itself, for example after joining the network.

An example of information of an FSM that can be uploaded and downloaded to a FSM directory or sent by a M2M device to managing servers can be represented using JSON or XLM. Below is an example of an FSM representation using JSON.

```
{
    // FSM registry name
    name    : "Test",
    // States
    state : [
        {
            name         : "A",
            initial      : true,
            on Exit      : "A_onExit"
        },
        {
            name         : "B",
            onEnter      : "B_onEnter"
        },
        {
            name         : "C"
        }
    ],
    transition : [
        {
            event        : "AB",
            from         : "A",
            to           : "B",
            onTransition: "TR_AB",
        },
        {
            event        : "BC",
            from         : "B",
            to           : "C"
        }
    ]
}
```

In the above example, the FSM's instance or configuration is called "Test" and it defines three different states (A, B, C) and two different transitions between the states, namely A to B and B to C.

One advantage of creating different FSMs or different sets of predefined states and transitions is that it creates a lot of flexibility of the M2M devices. M2M devices can be reconfigured with different FSMs and the same FSM can be replicated or copied into several other M2M devices. In addition, some of those FSMs can be hardcoded in some devices by the owner of the device making the process even more efficient and avoiding large amount of data to be transmitted between managing servers and M2M devices.

The above described embodiments also provide the advantage that by the managing server configuring the M2M device with predefined states and transitions, the M2M device has to process less data and so uses less battery, PCU and memory resources. Furthermore, the managing server may also be connectable to the mains such that it has a fixed power supply of electricity. Thus, as the managing server does not rely on battery there is no risk of depleting its power resources.

Figure 7:
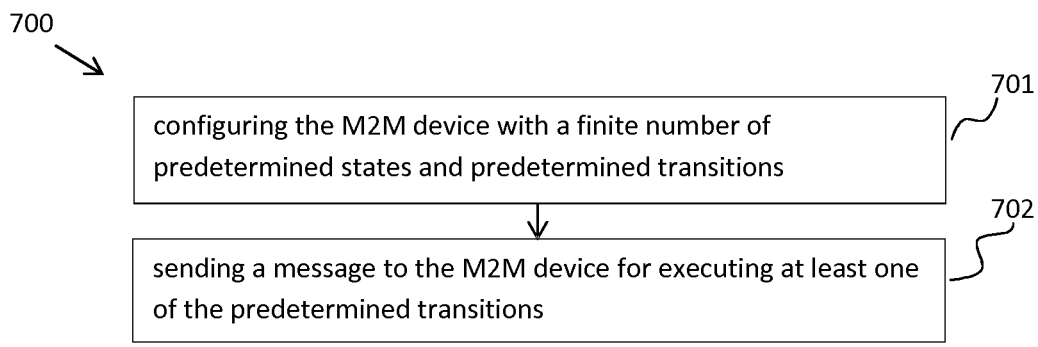
FIG. 7 is a flow chart illustrating process steps in a method performed by a M2M server.

A method 700 implemented by any of the managing servers described above will now be described with reference to FIG. 7. The method 700 is performed by a managing server or a M2M server for managing communication with a M2M device. The method comprises the step of configuring the M2M device with a finite number of predetermined states and predetermined transitions for moving the M2M device into one of its predetermined states, 701, and sending a message to the M2M device for executing at least one of the predetermined transitions 702.

"Moving the M2M device into one of its predetermined states" should be understood to comprise the M2M changing into a different state as well as remaining in the state it is already in. For example, the transition that is executed may cause the M2M device to change state, however the transition may also point towards the state that it is already in (e.g. transition 2.1 in FIG. 2). The M2M device may also execute a series of transitions such that it moves through different states and finally ends up in the state that it was initially in.

Method 700 enables M2M devices to easily be configured and reconfigured, and the amount of data sent between the managing server and the M2M device is reduced compared to CoAP as explained in detail above.

Figure 8:
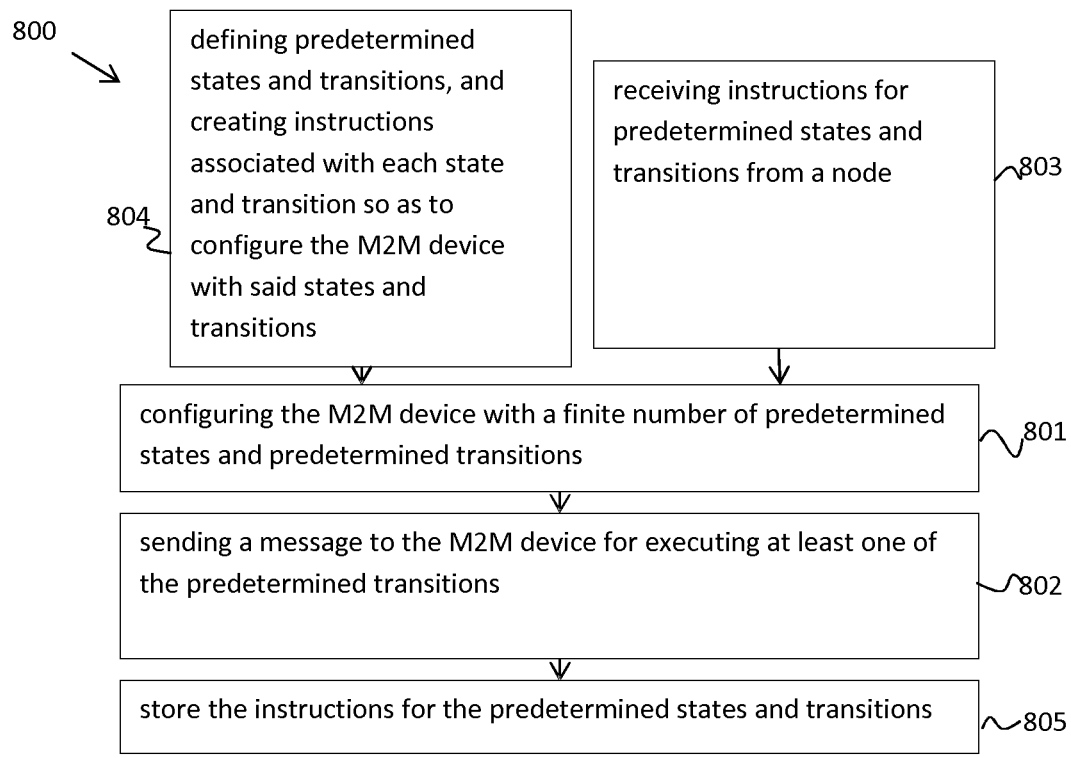
FIG. 8 is a flow chart illustrating process steps in a method performed by a M2M server.

Another method 800 will now be described with reference to FIG. 8. This method is also performed by a managing server and it comprises the same steps as that of method 700 such that step 701 and 702 correspond to steps 801 and 802. However, it also comprises some additional optional steps as will now be described.

As a preceding step, the method may comprise defining the predetermined states and transitions, and creating instructions associated with each state and transition so as to configure the M2M device with said states and transitions, step 804. Instructions may be a set of commands or software codes.

In an alternative embodiment, the method may comprise as a preceding step, receiving instructions for the predetermined states and transitions from another node, step 803. Said another node may be a directory or another M2M device. The instructions may be a set of commands or software codes for each state and transition such that the M2M server does not have to configure the instructions itself but can retrieve them from another node. This alleviates the M2M server from defining and creating the FSM.

The managing server may store the instructions for the predetermined states and transitions, 805. This provides the advantage that the managing server can determine which action to take next before contacting the M2M device thus reducing the number of messages sent.

In method 800 configuring the M2M device may comprise sending instructions to the M2M device to create, delete or modify a state or a transition, however the method is not limited to these instructions. For example, it may also comprise instructions for copying a state or a transition.

Each state may also be associated with a plurality of configurable elements. The configurable elements depend on the M2M device but may be a transceiver, receiver, on and off interface, or a heating element for changing temperature or a sensor for taking a reading.

Figure 9:
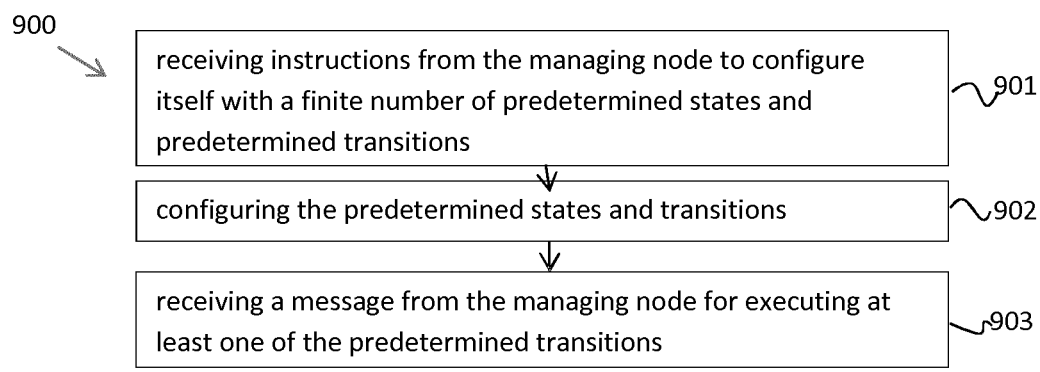
FIG. 9 is a flow chart illustrating process steps in a method performed by a M2M device.

Another method 900 will now be described with reference to FIG. 9. This method is performed by a M2M device for communicating with a managing node such as a M2M server. The method 900 comprises the M2M device receiving instructions from the managing node to configure itself with a finite number of predetermined states and predetermined transitions for moving the M2M device into one of its predetermined states, 901. The method further comprises configuring the predetermined states and transitions 902, and receiving a message from the managing node for executing at least one of the predetermined transitions 903.

This method provides the advantage that the M2M device is configurable and reconfigurable with FSMs or predetermined number of states and transitions which reduces the amount of data required to be sent between the M2M device and the managing server.

"Moving the M2M device into one of its predetermined states" should be understood to comprise the M2M changing into a different state as well as remaining in the state it is already in. For example, the transition that is executed may cause the M2M device to change state, however the transition may also point towards the state that it is already in (e.g. transition 2.1 in FIG. 2). The M2M device may also execute a series of transitions such that it moves through different states and finally ends up in the state that it was initially in.

Figure 10A:
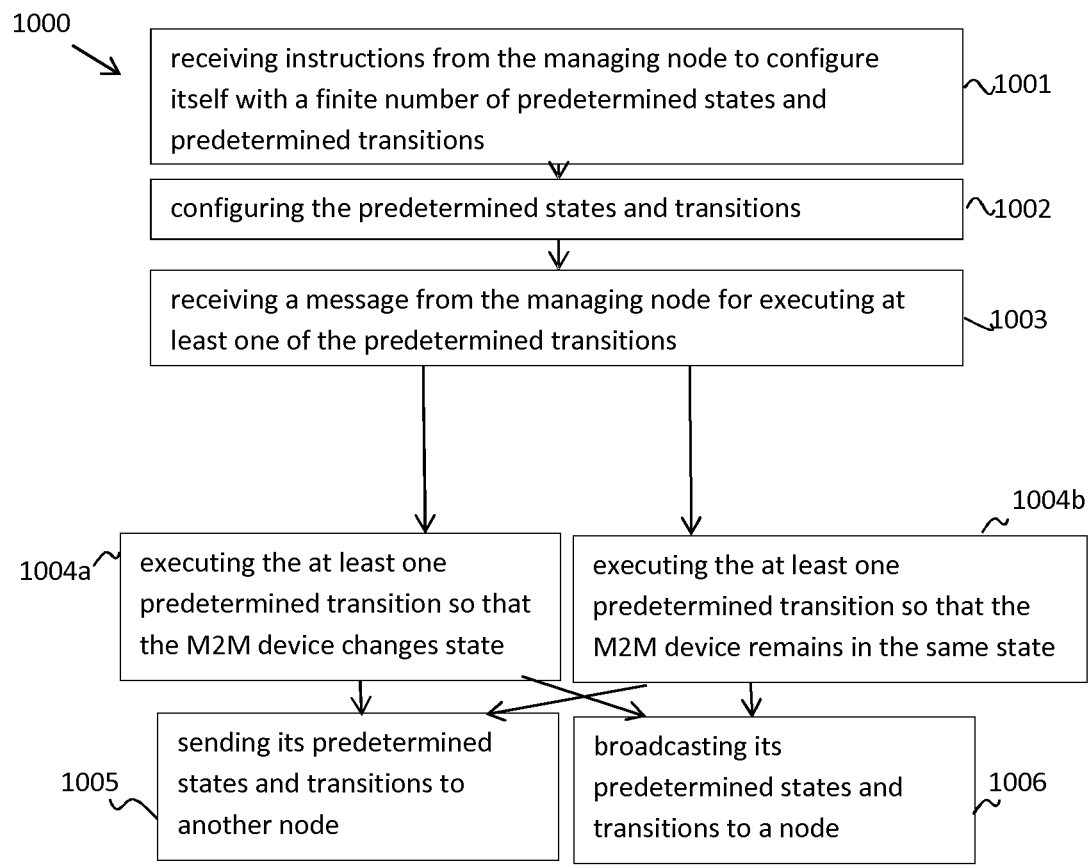
FIG. 10a is a flow chart illustrating process steps in a method performed by a M2M device.
Figure 10B:
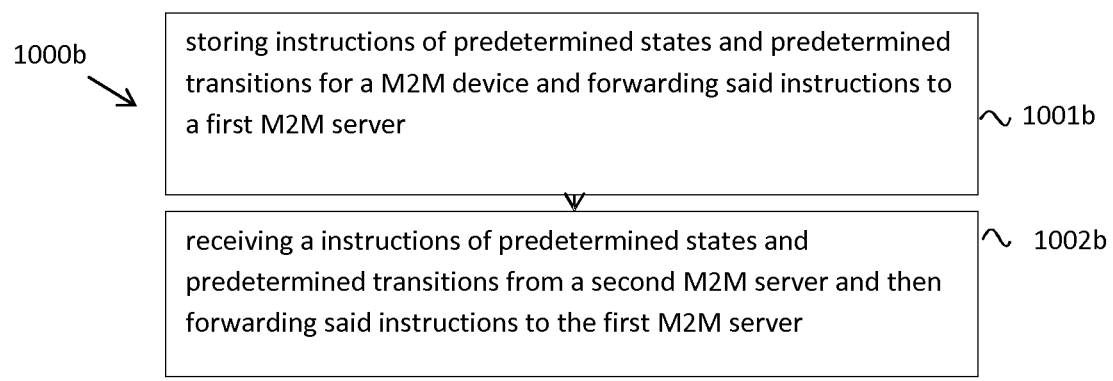
FIG. 10b is a flow chart illustrating process steps in a method performed by a node.

Another method 1000 will now be described with reference to FIG. 10*a*. This method is also performed by a M2M device and it comprises the same steps as that of method 900 such that steps 901, 902 and 903 correspond to steps 1001, 1002 and 1003. However, it may also comprise some additional optional steps as will now be described.

The method 1000 may further comprise executing the at least one predetermined transition so that the M2M device changes state, 1004*a*. Alternatively, the method 1000 may comprise executing the at least one predetermined transition so that the M2M device remains in the same state 1004*b*. The M2M device may remain in the same state by either the at least one transition that is executed points towards the state that the M2M device is already in, or alternatively the M2M devices executes a series or plurality of transitions which eventually takes the M2M device back to the state that it was initially in.

The method may comprise the M2M device sending its predetermined states and transitions to another node such as a managing server, M2M server or FSM directory 1005. The advantage of this is that other managing servers do not have to waste resources configuring the predetermined states and transitions when these have already been configured in another node. The FSM directory can store the states and transitions and provide them to another managing server.

In another embodiment, the M2M device may broadcast or multicast its predetermined states and transitions to a node connected to the same network as the M2M device 1006. Again, the node may be a managing server or FSM directory. This embodiment also provides the advantage of reducing waste of resources.

In method 900 and 1000, the message for executing at least one of the predetermined transitions may be 1, 2 or 3 bytes in length. Furthermore, the M2M device configuring itself may comprise receiving instructions from the managing node for creating, deleting or modifying a state or a transition, however the method is not limited to these instructions. For example the method may comprise other instructions such as copying.

Additionally, each state is associated with a plurality of configurable elements. The configurable elements depend on the M2M device but may be a transceiver, receiver, on and off interface, or a heating element for changing temperature or a sensor for taking a reading.

Another method 1000*b* will now be described. This method 100*b* is performed by a node such as a server functioning as a directory. The method is for managing communication between a machine-to-machine, M2M, server and a M2M device. The method comprises storing instructions of predetermined states and predetermined transitions for a M2M device and sending said instructions to a first M2M server, 1001*b*. The instructions are of predetermined states and transitions, for example, suitable computer programming instructions. By forwarding or sending the instructions to the first M2M server, the instructions are not executed by the first M2M server but are in turn sent by the first M2M server to a M2M device for the M2M device to execute said instructions. This means that the first M2M server does not have to configure the instructions itself.

The method may further comprise receiving instructions of predetermined states and predetermined transitions from a second M2M server and then sending said instructions to the first M2M server, 1002*b*.

The above methods 700, 800, 900, and 1000 may be performed by elements cooperating to form a system for managing communication between a managing server and a M2M device. Such a system is illustrated in FIG. 7 and it comprises a managing server comprising means for configuring a M2M device with a finite number of predetermined states and predetermined transitions for moving the M2M device into on of its predetermined states, the managing server further comprising means for instructing the M2M device to execute at least one of the predetermined transitions, and the M2M device further comprising means for moving into a state upon executing said at least one the predetermined transitions.

The system may further comprise a directory for providing the M2M server with the instructions of the predetermined states and transitions.

As previously mentioned, "Moving the M2M device into one of its predetermined states" should be understood to comprise the M2M changing into a different state as well as remaining in the state it is already in. For example, the transition that is executed may cause the M2M device to change state, however the transition may also point towards the state that it is already in (e.g. transition 2.1 in FIG. 2). The M2M device may also execute a series of transitions such that it moves through different states and finally ends up in the state that it was initially in.

Figure 11:
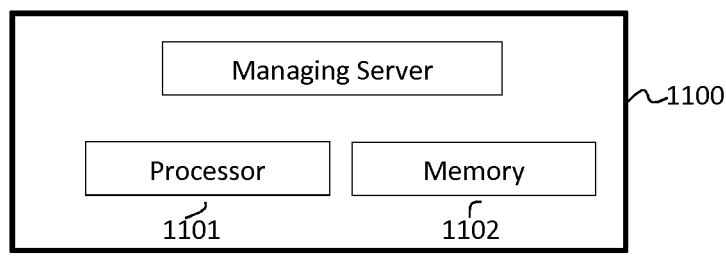
FIG. 11 is a block diagram illustrating a M2M server.
Figure 12:
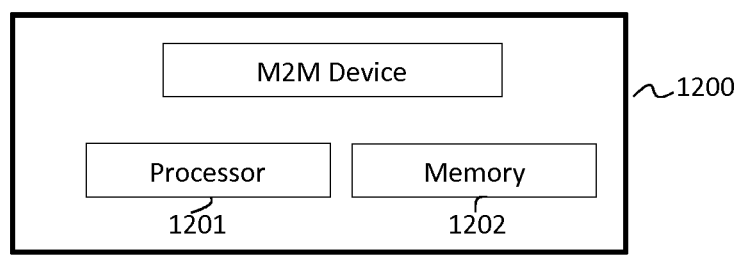
FIG. 12 is a block diagram illustrating a M2M device.
Figure 13:
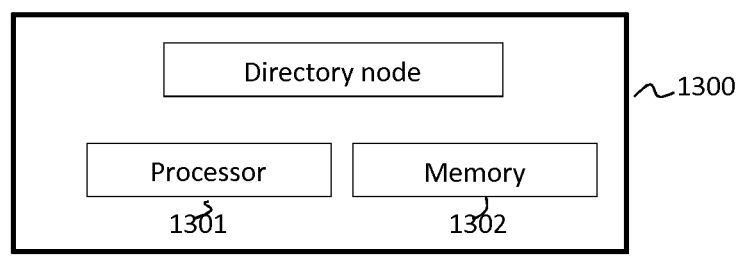
FIG. 13 is a block diagram illustrating a directory node.

The methods of the present invention, as illustrated by the above examples, may be conducted on receipt of instructions such as suitable computer readable instructions, which may be embodied within a computer program running on the managing server or the M2M devices. FIGS. 11, 12 and 13 illustrate examples of a managing server, a M2M device and a directory node for managing communication therebetween, which may execute the methods of the present invention, for example on receipt of suitable instructions from a computer program. Referring to FIGS. 11, 12 and 13, each of the managing server 1100, the M2M device 1200 and the directory node 1300 comprises a processor 1101, 1201, 1301 and a memory 1102, 1202, 1302. The memory 1102, 1202, 1302 contains instructions executable by the processor 1101, 1101, 1301 such that the managing server 1100 is operative to carry out the methods 700 and 800, the M2M device 1200 is operative to carry out methods 900 and 1000 and the directory node is operative to carry out method 1000*b*.

Figure 14:
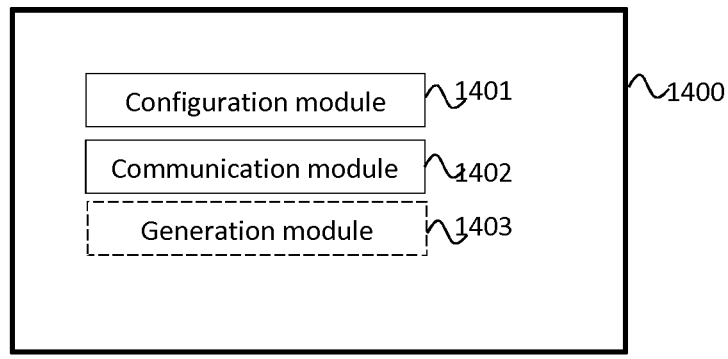
FIG. 14 is a block diagram illustrating another example of a M2M server.

FIG. 14 illustrates functional units in another embodiment of a managing server 1400 which may execute methods 700 and 800, for example according to computer readable instructions received from a computer program. It will be understood that the units illustrated in FIG. 14 are software implemented functional units, and may be realized in any appropriate combination of software modules. The software modules may be executed by a processor.

Referring to FIG. 14 a M2M server 1400 is shown. The M2M server 1400 is for managing communication with a machine-to-machine, M2M, device. The M2M server comprises a configuration module 1401 for configuring the M2M device with a finite number of predetermined states and predetermined transitions for moving the M2M device into one of its predetermined states, a communication module 1402 for sending a message to the M2M device for executing at least one of the predetermined transitions.

As previously mentioned, "moving the M2M device into one of its predetermined states" should be understood to comprise the M2M changing into a different state as well as remaining in the state it is already in. For example, the transition that is executed may cause the M2M device to change state, however the transition may also point towards the state that it is already in (e.g. transition 2.1 in FIG. 2). The M2M device may also execute a series of transitions such that it moves through different states and finally ends up in the state that it was initially in.

The M2M server may further comprise a generation module 1403 for defining the predetermined states and transitions, and creating instructions associated with each state and transition so as to configure the M2M device with said states and transitions.

The communication module 1402 may further comprise means for receiving instructions for the predetermined states and transitions from a directory or another M2M device.

The communication module 1402 may further comprise means for sending instructions to the M2M device to create, delete or modify a state or a transition so as to configure the M2M device. However, the communication module is not limited to these particular instructions, it can send any other suitable instruction.

Each state may be associated with a plurality of configurable elements. The configurable elements depend on the M2M device but may be a transceiver, receiver, on and off interface, or a heating element for changing temperature or a sensor for taking a reading.

Figure 15:
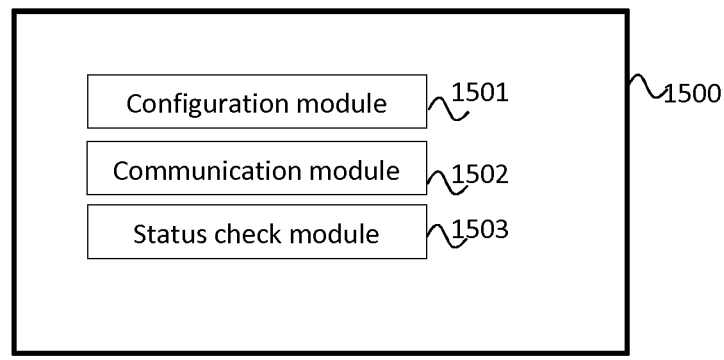
FIG. 15 is a block diagram illustrating another example of a M2M device.

Referring to FIG. 15, functional units in another embodiment of a M2M server 1500 which may execute methods 900 and 1000, for example according to computer readable instructions received from a computer program. It will be understood that the units illustrated in FIG. 15 are software implemented functional units, and may be realized in any appropriate combination of software modules. The software modules may be executed by a processor.

Referring to FIG. 15 a M2M device 1500 is shown. The M2M device is for communicating with a managing node. The M2M device comprises a communication module 1502 for receiving instructions from the managing node to configure itself with a finite number of predetermined states and predetermined transitions moving the M2M device into one of its predetermined states, and a configuration module 1501 for executing the instructions so as to configure the predetermined states and transitions. The communication module 1502 further comprises means for receiving a message from the managing node for executing at least one of the predetermined transitions.

The configuration module 1501 may further comprise means for executing the at least one predetermined transition so that the M2M device changes state so that the M2M device changes state or so that the M2M remains in the same state. The M2M device may remain in the same state by either the at least one transition that is executed points towards the state that the M2M device is already in, or alternatively the M2M devices executes a series or plurality of transitions which eventually takes the M2M device back to the state that it was initially in.

The configuration module 1501 may further comprise means for creating, deleting and modifying a state or a transition so as to configuring itself upon receiving instructions from the managing node, however the configuration module is not limited to only creating, deleting or modifying. For example, it may additionally or alternatively copy a state and/or transition.

The communication module 1502 may further comprise means for sending its predetermined states and transitions to another node. This other node may be another managing server or a directory.

The communication module 1502 may further comprise means for broadcasting or multicasting its predetermined states and transitions to a node connected to the same network as the M2M device. This other node may be a managing server or a directory.

The message for executing at least one of the predetermined transitions may be 1, 2 or 3 bytes in length. Additionally, each state is associated with a plurality of configurable elements. The configurable elements depend on the M2M device but may be a transceiver, receiver, on and off interface, or a heating element for changing temperature or a sensor for taking a reading.

Figure 16:
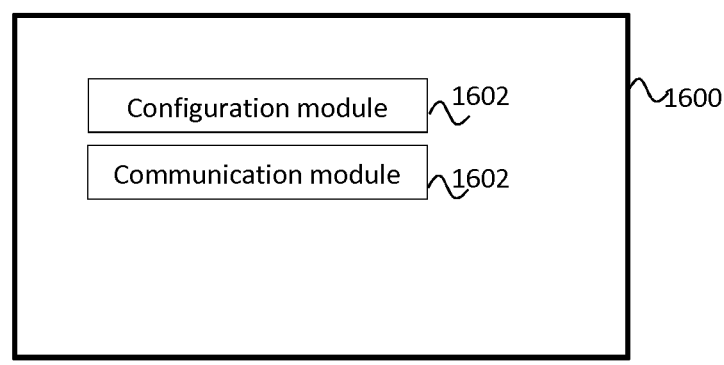
FIG. 16 is a block diagram illustrating another example of a directory node.

Referring to FIG. 16, functional units in another embodiment of a directory node 1600 which may execute method 1000*b*, for example according to computer readable instructions received from a computer program. It will be understood that the units illustrated in FIG. 16 are software implemented functional units, and may be realized in any appropriate combination of software modules. The software modules may be executed by a processor.

Referring to FIG. 16 a directory node 1600 is shown. The directory node comprises a storing module 1601 for storing instructions of predetermined states and predetermined transitions for a M2M device, and a communication module 1602 for forwarding or sending said instructions to a first M2M server. By forwarding or sending the instructions to the first M2M server, the instructions are not executed by the first M2M server but are in turn sent by the M2M server to a M2M device for the M2M device to execute said instructions. This means that the M2M server does not have to configure the instructions itself.

The communication module 1602 may further comprise means for receiving instructions of predetermined states and predetermined transitions from a second M2M server and then sending said instructions to the first M2M server.

Aspects of the present invention thus provide, methods, apparatus, computer programs and a system for managing communication between a M2M server and a M2M device. The M2M server configures the M2M device with predefined states and transitions such so that by executing a transition the M2M device can change state. Aspects of the invention provide advantages such as reconfigurable M2M devices and minimized data transmission. The above described embodiments also provide the advantage that by the managing server configuring the M2M device with predefined states and transitions, the M2M device has to process less data and so uses less battery, PCU and memory. Furthermore, the managing server may also be connectable to the mains such that it has a fixed power supply of electricity. Thus, as the managing server does not rely on battery there is no risk of depleting its power resources.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A machine-to-machine (M2M) server for managing communication with a M2M device, the M2M server comprising;
    a memory; and
    a processor coupled to the memory, wherein the M2M server is configured to:
    send to the M2M device a create state instruction for causing the M2M device to create a set of two or more predetermined states, the set of two or more predetermined states comprising a first predetermined state and a second predetermined state;
    send to the M2M device a create transition instruction for causing the M2M device to create one or more predetermined transitions, the one or more predetermined transitions comprising a transition from the first predetermined state to the second predetermined state; and
    send a message to the M2M device for executing at least one of the one or more predetermined transitions.

2. The M2M server according to claim 1, wherein each state of the set of two or more predetermined states is associated with a plurality of configurable elements.

3. The M2M server according to claim 2, wherein the M2M server is further configured to send instructions to the M2M device to create, delete or modify a state or a transition so as to configure the M2M device.

4. The M2M server according to claim 1, wherein the M2M server is further configured to define the set of two or more predetermined states and the one or more predetermined transitions and create instructions associated with each state and transition so as to configure the M2M device with said states and transitions.

5. The M2M server according to claim 1, further comprising a receiver for receiving instructions for the set of two or more predetermined states and the one or more predetermined transitions from a node.

6. The M2M server according to claim 1, wherein the create state instruction and the create transition instruction are included in a message transmitted by the M2M server to the M2M device.

7. A machine-to-machine (M2M) device for communicating with a M2M server, the M2M device comprising:
    a receiver for receiving:
        a create state instruction transmitted by the M2M server for causing the M2M device to create a set of two or more predetermined states, the set of two or more predetermined states comprising a first predetermined state and a second predetermined state;
        a create transition instruction transmitted by the M2M server for causing the M2M device to create one or more predetermined transitions, the one or more predetermined transitions comprising a transition from the first predetermined state to the second predetermined state; and
        a message transmitted by the M2M server for causing the M2M device to execute at least one of the one or more predetermined transitions;
    a processor for executing the instructions so as to create the predetermined states and transitions and for processing the message transmitted by the M2M server for executing at least one of the one or more predetermined transitions.

8. The M2M device according to claim 7, wherein the M2M device is further configured to execute the one or more predetermined transitions so that the M2M device changes state.

9. The M2M device according to claim 7, wherein the M2M device is further configured to execute the one or more predetermined transitions so that the M2M device remains in the same state.

10. The M2M device according to claim 7, wherein each state of the set of two or more predetermined states is associated with a plurality of configurable elements.

11. The M2M device according to claim 7, wherein the M2M device is operable to create, delete, and modify a state or a transition so as to configuring itself upon receiving commands from the M2M server.

12. The M2M device according to claim 7, further comprising a transmitter for sending the set of two or more predetermined states and the one or more transitions to another node.

13. The M2M device according to claim 7, further comprising a transmitter for broadcasting the set of two or more predetermined states and the one or more transitions to a node connected to the same network as the M2M device.

14. The M2M device according to claim 7, wherein the message for executing at least one of the set of two or more predetermined transitions is 1, 2 or 3 bytes in length.

15. An apparatus comprising the M2M device according to claim 7, wherein the apparatus is a vehicle, user equipment or an appliance.

16. A system for managing a machine to machine (M2M) device, the system comprising;
- a M2M server configured to send to the M2M device a create state instruction for causing the M2M device to create a set of two or more predetermined states, the set of two or more predetermined states comprising a first predetermined state and a second predetermined state, and to send to the M2M device a create transition message for causing the M2M device to create one or more predetermined transitions, the one or more predetermined transitions comprising a transition from the first predetermined state to the second predetermined state, wherein
- the M2M server is further configured instruct the M2M device to execute at least one of the one or more predetermined transitions, and
- the M2M device is configured to move into a state upon executing said at least one of the one or more predetermined transitions.

* * * * *